US008498492B2

(12) United States Patent
Declerck et al.

(10) Patent No.: US 8,498,492 B2
(45) Date of Patent: Jul. 30, 2013

(54) METHODS OF ANALYZING A SELECTED REGION OF INTEREST IN MEDICAL IMAGE DATA

(75) Inventors: Jerome Declerck, Oxford (GB); Timor Kadir, Oxford (GB); Matthew David Kelly, Botley Oxfordshire (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 417 days.

(21) Appl. No.: 12/847,344

(22) Filed: Jul. 30, 2010

(65) Prior Publication Data
US 2011/0026797 A1 Feb. 3, 2011

(30) Foreign Application Priority Data
Jul. 31, 2009 (GB) .................... 0913314.1

(51) Int. Cl.
*G06K 9/68* (2006.01)
(52) U.S. Cl.
USPC ........................................ 382/226
(58) Field of Classification Search
USPC .................. 382/131, 226
See application file for complete search history.

(56) References Cited

U.S. PATENT DOCUMENTS

| | | | | |
|---|---|---|---|---|
| 5,873,823 A * | 2/1999 | Eidelberg et al. | ............. | 600/407 |
| 7,236,558 B2 * | 6/2007 | Saito et al. | ......................... | 378/4 |
| 7,336,809 B2 * | 2/2008 | Zeng et al. | ..................... | 382/128 |
| 7,929,748 B2 * | 4/2011 | Peterson et al. | ............... | 382/131 |
| 2005/0088629 A1 * | 4/2005 | Greenberg et al. | ............. | 353/94 |
| 2005/0148852 A1 * | 7/2005 | Tank | .............................. | 600/407 |
| 2005/0157925 A1 * | 7/2005 | Lorenz | ......................... | 382/173 |
| 2007/0081712 A1 | 4/2007 | Huang et al. | | |
| 2007/0127796 A1 * | 6/2007 | Nay et al. | ....................... | 382/128 |
| 2008/0063304 A1 * | 3/2008 | Russak et al. | .................. | 382/298 |
| 2008/0118134 A1 | 5/2008 | Sirohey et al. | | |
| 2009/0028289 A1 * | 1/2009 | Tsuyuki et al. | .................... | 378/8 |
| 2009/0273610 A1 | 11/2009 | Busch et al. | | |
| 2009/0296998 A1 | 12/2009 | Fox et al. | | |

OTHER PUBLICATIONS

"From Recist to Percist: Evolving Considerations for PET Response Criteria in Solid Tumors," Wahl et al., The Journal of Nuclear Medicine, vol. 50, No. 5 (Suppl) (2009) pp. 122S-150S.

* cited by examiner

*Primary Examiner* — Gerald J. O'Connor
*Assistant Examiner* — John Go
(74) *Attorney, Agent, or Firm* — Schiff Hardin LLP

(57) ABSTRACT

In methods and an apparatus for analyzing a selected region of interest in medical image data of a subject, an initial image data set is obtained, and the initial image data set is filtered to generate a filtered data set. The filtering includes computing, for each voxel of the initial image data set, a value of intensity for a standardized volume of interest centered on that voxel. A user selection of a region of interest in the initial image data set is registered, and from the filtered image data set a value of intensity for the selected region of interest is computed.

18 Claims, 4 Drawing Sheets

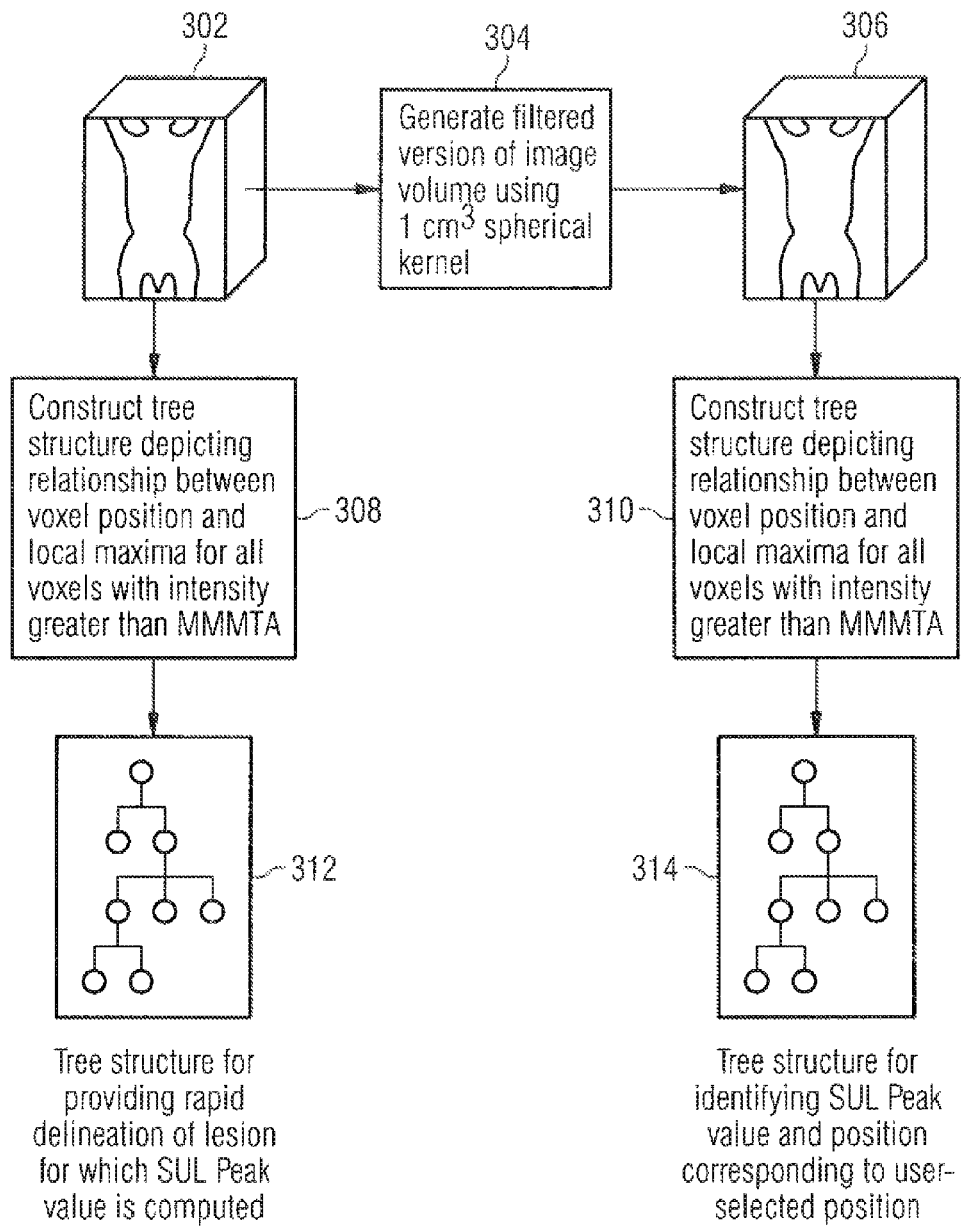

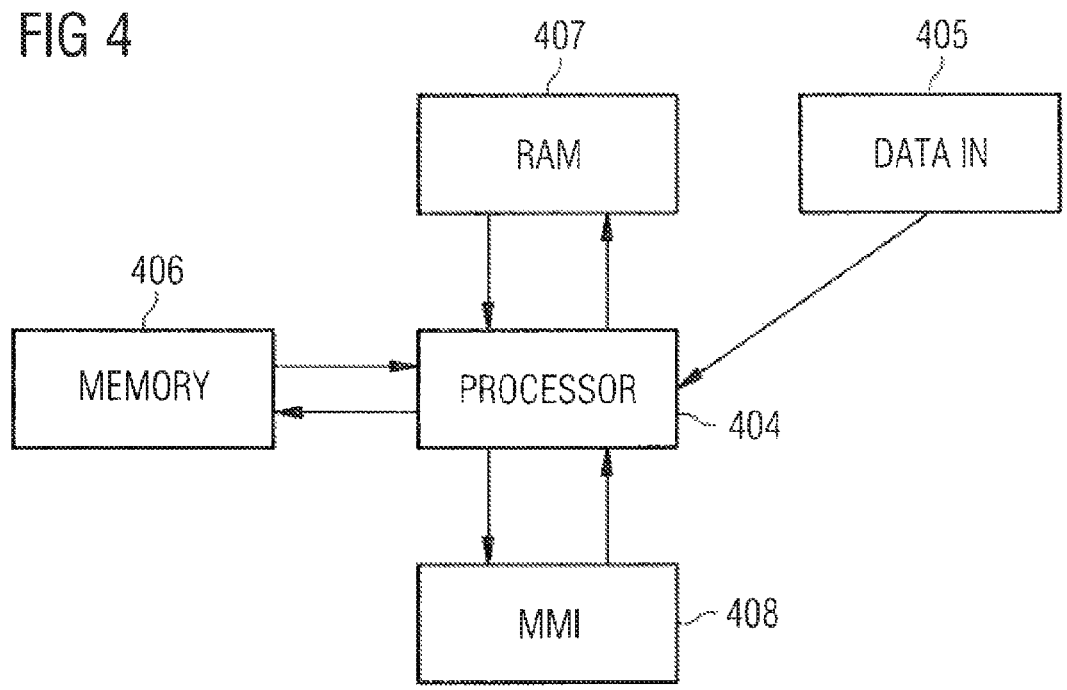

METHODS OF ANALYZING A SELECTED REGION OF INTEREST IN MEDICAL IMAGE DATA

BACKGROUND OF THE INVENTION

1. Field of the Invention

This invention is directed to methods and apparatus for analyzing a selected region of interest in medical image data of a subject.

2. Description of the Prior Art

In the medical imaging field, several imaging schemes are known. For example PET (Positron Emission Tomography) is a method for imaging a subject in 3D using an injected radioactive substance which is processed in the body, typically resulting in an image indicating one or more biological functions.

The definition of regions or volumes of interest (ROI/VOI) is a typical precursor to quantitative analysis of medical images, such as nuclear medicine emission images (for example, PET or SPECT). Such regions may be defined around areas of high intensity which correspond to high tracer uptake (hotspots). For example, in FDG-PET images for oncology; such areas may be indicative of the presence of a tumor. Oncology physicians frequently annotate lesions in PET scans for the purpose of making a diagnosis, or for use in radiotherapy. The mean or maximum tracer uptake can aid a reader in determining the likelihood of cancer.

Radiologists and nuclear medicine clinicians regularly read a large number of clinical PET studies each day. Traditionally, clinical decisions were made on the basis of a largely qualitative assessment of PET scans; however, there is a strong drive towards a more standardized, quantitative assessment. This drive is highlighted by the recent publication of the proposed PERCIST criteria for evaluating PET response ("From RECIST to PERCIST: Evolving Considerations for PET Response Criteria in Solid Tumors"—Wahl, 2009, JNM. 50(5) 122s-150s). This PERCIST criteria can be regarded as the PET, or functional imaging, equivalent of the RECIST criteria of anatomical response, which focuses on changes in size of a lesion.

In brief the PERCIST criteria recommends measuring SUL (lean body mass-corrected SUV) peak for up to 5 lesions (with a maximum of 2 per organ). SUL peak for a lesion is measured by positioning a spherical ROI of 1 $cm^3$ volume within the lesion so as to maximize the mean SUL within the ROI. To be considered a lesion by the PERCIST criteria, each hotspot must have a SUL peak (from a pre-treatment scan) at least 1.5×mean liver SUL+2 standard deviations of the mean SUL (from a 3 cm diameter spherical ROI positioned in the right hepatic lobe). If the liver is diseased, then 2.0×blood-pool activity+2 standard deviations in the mediastinum is suggested as the minimal metabolically measurable tumor activity (MMMTA). Of course, the specific parameters here may change in future versions of the PERCIST criteria, or related standards.

A number of manufacturers provide software for reviewing clinical PET imaging data (e.g., TrueD from Siemens Healthcare). These applications provide a variety of tools to aid the clinician in their review of a case, including ROI-drawing tools. However, currently-available ROI tools still require considerable input from the clinician and are not designed specifically to support a PERCIST-style evaluation. Clinician input will typically be precise delineation of an ROI or of a bounding region for an ROI along with a threshold value.

The requirements for quantitative evaluation outlined in the PERCIST criteria clearly place an added burden on the reporting clinician in terms of ROI creation and reporting. The present invention aims to address this additional burden and the associated problems, and provide improvements upon the known methods.

In general terms, an embodiment of a first aspect of the invention provides a method of analyzing a selected region of interest in medical image data of a subject, including obtaining an initial image data set; filtering the initial image data set to generate a filtered data set, wherein the step of filtering comprises computing, for each voxel of the initial image data set, a value of intensity for a standardized volume of interest centered on that voxel; registering a user selection of a region of interest in the initial image data set; and computing from the filtered image data set a value of intensity for the selected region of interest.

This allows a fast means of computing the required standardized intensity value for reference with the selected region of interest.

Preferably, the value of intensity for the standardized volume of interest is a value of mean SUL. More preferably, the standardized volume of interest is a 1 $cm^3$ spherical volume of interest. Still more preferably, the value of intensity for the selected region of interest is the local maximum SUL for the region of interest.

In an embodiment, the step of registering the user selection of the region of interest includes obtaining a list of voxels of the initial image data set sorted according to intensity; registering a user-selection of an initial voxel in the initial image data set; and selecting, as the region of interest, at least one voxel from the sorted list according to a property of the at least one voxel in relation to the user-selected initial voxel.

Suitably, the step of selecting the region of interest further includes determining a set of candidate regions of interest in the initial image data set; and determining a hierarchy among the set of candidate regions according to intensity, wherein the region of interest selected is one of the candidate regions.

Preferably, the step of computing the value of intensity for the region of interest includes determining a region of the filtered image data set corresponding to the selected region of interest in the initial image data set; and determining the voxel in the filtered image region having the maximum intensity value, and returning that maximum intensity value as the value of intensity for the selected region of interest.

Suitably, the step of determining the region of the filtered image data set includes obtaining a list of voxels of the filtered image data set sorted according to intensity, determining a set of candidate regions of interest in the filtered image data set, and determining a hierarchy among this set of candidate regions according to intensity, wherein each filtered set candidate region is associated with a local maximum value of intensity.

In an embodiment, the method further includes pre-processing the respective image data set to generate the list of voxels of the image sorted according to intensity; and following generation of the list, registering the user selection of the initial voxel.

In another embodiment, the region selected in the initial image data set includes the user-selected voxel. In still another embodiment, the region selected in the initial image data set is a region associated with the closest local maximum intensity value to the user-selected voxel.

Preferably, the hierarchy of candidate regions is generated by a connected-component algorithm.

In one embodiment, the method further includes displaying the initial image data set; and displaying with the initial image data set the computed value of intensity for the selected region of interest.

Suitably, the property of the at least one voxel is intensity, and wherein the minimal metabolically measurable tumor activity is set as a threshold in relation to the user-selected voxel.

Preferably, the list is obtained for those voxels of the respective image data set having values for intensity greater than the minimal metabolically measurable tumor activity Suitably, the method further comprises: determining a hepatic or mediastinal region of interest in the initial image data set; and calculating the minimal metabolically measurable tumor activity from a measurement of intensity in the hepatic or mediastinal region of interest.

An embodiment of a second aspect of the invention provides an apparatus for analyzing a selected region of interest in medical image data of a subject, that includes a processor adapted to: obtain an initial image data set; filter the initial image data set to generate a filtered data set, wherein the step of filtering comprises computing, for each voxel of the initial image data set, a value of intensity for a standardized volume of interest centered on that voxel; register a user selection of a region of interest in the initial image data set; and compute from the filtered image data set a value of intensity for the selected region of interest; and a display device for displaying the initial image data set and the computed value of intensity for the selected region of interest.

An embodiment of a third aspect of the invention provides a method of analyzing a selected region of interest in medical image data of a subject captured by a medical imaging apparatus, the method comprising: obtaining, by a processor, an initial image data set; filtering, by processor, the initial image data set to generate a filtered data set, wherein the step of filtering includes computing, for each voxel of the initial image data set, a value of intensity for a standardized volume of interest centered on that voxel; registering, by a processor, a user selection of a region of interest in the initial image data set; computing, by a processor, from the filtered image data set a value of intensity for the selected region of interest; and displaying on a display device the initial image data set and the computed value of intensity for the selected region of interest.

The invention also encompasses a non-transitory computer-readable storage medium encoded with program code that, when the program code is loaded into or run on a computer, causes the computer to implement a method as described above and/or to become an apparatus as described above.

The above aspects and embodiments may be combined to provide further aspects and embodiments of the invention.

BRIEF DESCRIPTION OF THE DRAWINGS

FIG. 3 is a schematic diagram illustrating steps for calculating a peak SUL value for a user-selected ROI, according to an embodiment of the invention.

FIG. 4 is a diagram illustrating an apparatus according to an embodiment of the invention.

DESCRIPTION OF THE PREFERRED EMBODIMENTS

Figure 1:
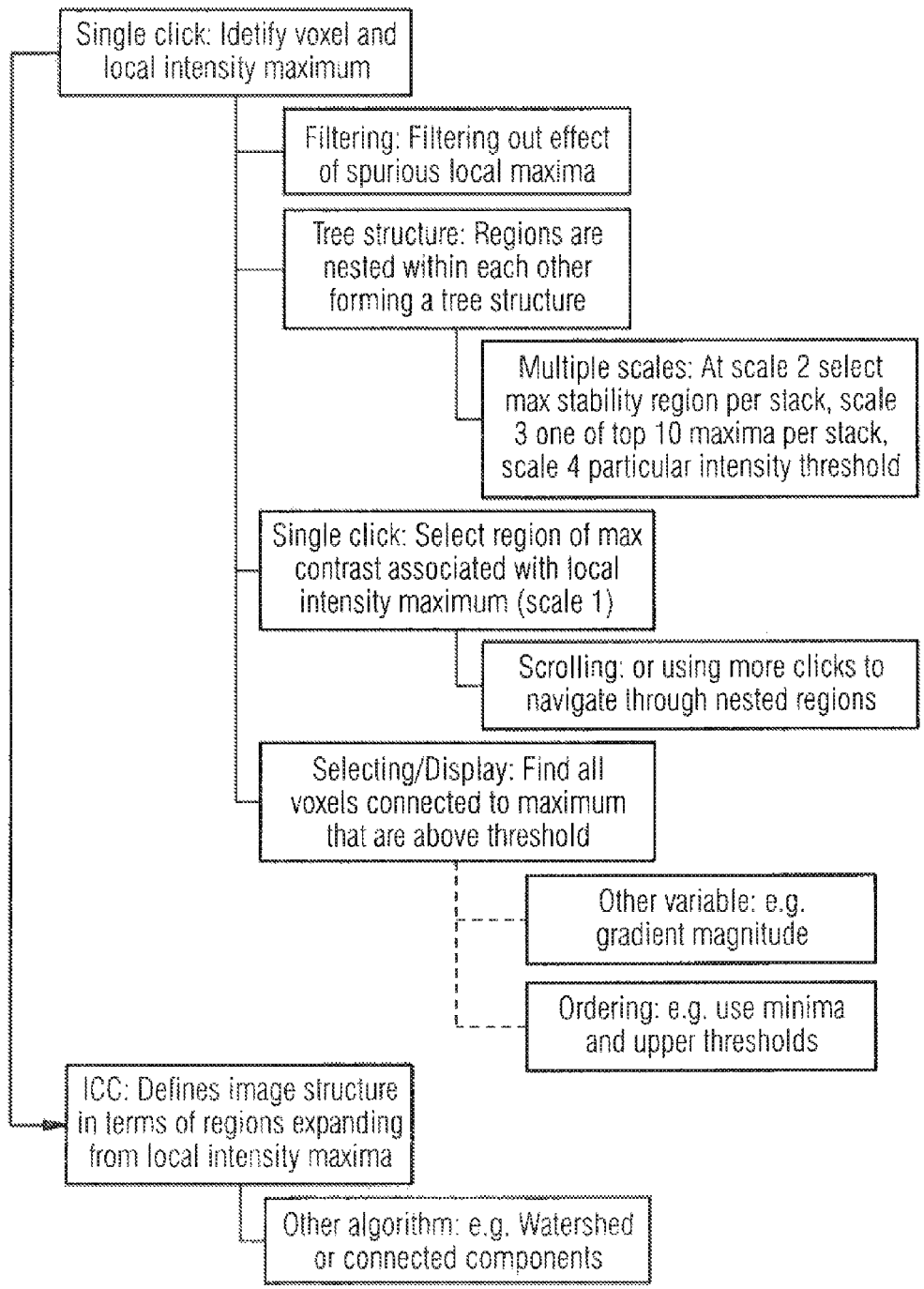
FIG. 1 is a diagram illustrating steps for calculating a tree structure according to an embodiment of the invention.

When the following terms are used herein, the accompanying definitions can be applied:

PET—Positron Emission Tomography

SUV—Standardized Uptake Value

SUL—Lean body mass-corrected SUV

PERCIST—PET Response Criteria in Solid Tumours

Mediastinum—a non-delineated group of structures in the thorax (chest), surrounded by loose connective tissue. It is the central compartment of the thoracic cavity. It contains the heart, the great vessels of the heart, esophagus, trachea, thymus, and lymph nodes of the central chest ROI/VOI—Region\Nolume of interest.

MMMTA—minimal metabolically measurable tumor activity.

ICC—Iterative Connected Component algorithm

Threshold—a particular intensity value within an image, often above or below which all pixels or voxels are accepted for a process or algorithm.

In embodiments, the invention addresses the above noted problems by providing a PERCIST-specific reading workflow with minimal user input for ROI positioning and creation.

In one embodiment, this is done by filtering the initial image data set by computing a value of intensity for a standardized volume of interest centered on each voxel, and deriving from the filtered image a value of intensity for the selected ROI in the original image.

In certain embodiments, the invention makes use of the functionality previously detailed in UK patent application no. GB 0914637, of the same applicant. Specifically, it makes use of the algorithm for rapidly identifying local maxima within an image volume and constructing 3D ROIs about this maxima in which all voxels have a value above a specified threshold—referred to as a tree structure. These improvements automate some steps of the PERCIST evaluation, reducing significant overhead and user variability in the process. The following briefly summarizes features of this method.

In a basic version, the method involves obtaining a list or hierarchy of voxels (or groups of voxels) of the image sorted in some way, for example according to intensity (such as SUV value for an FDG-PET scan). A user then selects an initial voxel in an image, and a group of (at least one) voxels from the sorted list or hierarchy is selected as a region of interest, according to some property of this group in relation to the user-selected voxel.

Typically, the list or hierarchy is obtained by pre-processing the image, which can be using an iterative connected component (ICC) algorithm. An algorithm on which this ICC algorithm is in part based was introduced by Matas (Matas et al, *Robust Wide Baseline Stereo from Maximally Stable Extremal Regions*, Proc. Of British Machine Vision Conference, 2002).

The pre-processing operates by sorting the intensities in the image into descending order. The sorted list of intensities is traversed; the first voxel is labeled as the first local maximum, and the second, if not a neighbor of the first voxel, is labeled as a second local maximum. Thus those locations that currently have no neighbors form new labels (each label is associated with one local maximum) and those adjacent to labeled voxels take the (adjacent) label with the highest maximum.

Merges are recorded; if a voxel is connected by neighbors to both (for example) the first and second maxima, it is labeled as such. The output of the algorithm is: a label image, an intensity sorted list of voxels and a list of merges and a list of starting points.

FIG. 1 sets out the processes generally involved in an embodiment of the present invention. The hierarchy or tree structure of the result of the ICC pre-processing is used to detect a set of candidate regions or volumes of interest (VOIs), whose relationships are encoded by the hierarchical grouping.

In one example, a tree is generated using the output of an ICC algorithm. The tree structure represents the VOIs resulting from a set of threshold values applied to the image data; for example, a series of set threshold values may be used, and these are the points at which a new region of interest or VOI is recorded.

Figure 2:
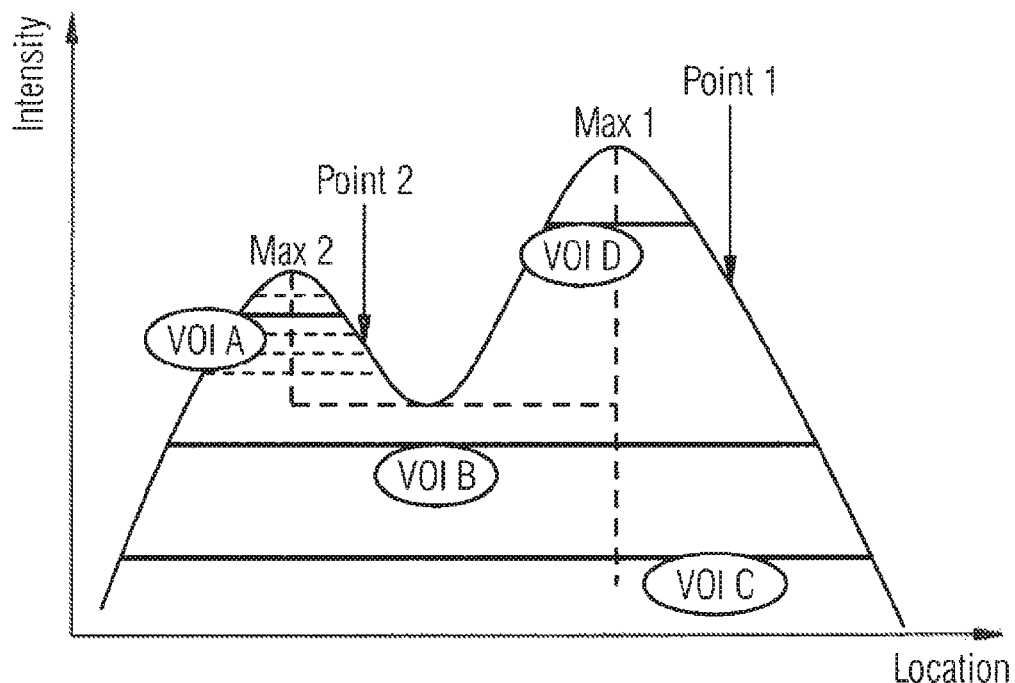
FIG. 2 is a diagram illustrating a tree structure according to an embodiment of the invention.

In such a representation, one or more of such VOIs may be associated with a particular local maximum. This structure may then be used to rapidly navigate the regions in the image. A simple example of such a structure for a 1D image is shown in FIG. 2, a 1D analogue of a 3D image showing how regions (volumes) are arranged into a hierarchy, consisting of two maxima (Max 1, Max 2) and four VOIs A, B, C and D. VOIs are shown as a bold line (indicating a set of locations) and a nearby ellipse (indicating the VOI label).

When the user clicks on a location, or hovers the cursor on the location, the nearest significant maximum within the hierarchy is selected. The maximum is associated with a subset of VOIs on a single path segment through the tree. For example in FIG. 2, point 1 is associated with maximum 1, which in turn, is associated with VOIs: B, C and D. Initially, the VOI within the path segment with the highest corresponding lesion likelihood is selected. For click point 1 in FIG. 2, this may be VOI B, say. At this point the user may decide that he or she prefers a differently sized VOI so the user can scroll up to select VOI D or down to select VOI C.

If the user clicks at point 2, VOI A is selected, as this is the only VOI associated with max 2. However the user may still scroll down to select VOI B or C. The selection remains bound to the originally selected maximum, so scrolling up returns the user to VOI A rather than VOI D. If required, the user may request a finer selection of VOIs, for example the VOIs shown with dotted lines near VOI A.

Returning to the specific embodiments for the present invention, in one embodiment, the workflow for applying the method is as follows:

1. A PET image volume is loaded within a user's workflow application and, for example, the "PERCIST Evaluation" workflow is selected.

2. The liver is automatically identified by a known method (e.g., from an atlas-based registration) and a 3 cm diameter ROI positioned in the right hepatic lobe.

3. The mean SUL is computed for this hepatic ROI (alternatively, the SUL computed could be compared to a 'normal' database and if outside the expected range (i.e., due to possible liver disease), the algorithm could then identify the mediastinal blood pool (e.g., from an atlas-based registration) and create an alternative ROI there as specified in the Wahl document).

4. The minimal metabolically measurable tumor activity (MMMTA) (viz. Wahl 2009) is computed based on the SUL measured in either the hepatic or mediastinal ROI (see previous step).

5. A second version of the image volume is created by filtering the original volume with a filter corresponding to computing at each voxel, the mean intensity of a 1 cm$^3$ spherical VOI centered on that voxel.

6. On both the original and filtered versions of the image, the tree structure depicting the relationship between voxel position and local maxima is constructed (see explanation of tree structure above) for all voxels of intensity greater than the MMMTA (as computed in step 4). The tree structure for the original image will be used to aid rapid delineation of the VOIs used in the PERCIST evaluation, while the tree structure for the filtered image will be used to rapidly identify the SUL peak value corresponding the delineated VOI.

Following the above pre-computation steps, the reviewing clinician is now able to review the image as outlined in subsequent steps.

7. For lesion of interest, the clinician moves the mouse cursor close to the lesion (in the original image).

8. The algorithm automatically identifies the local maximum corresponding to the cursor position, then creates and displays a bounding VOI using the tree structure constructed for the original image volume in step 6, with the threshold set to the MMMTA. The SUL peak (i.e. the local maximum in SUL) corresponding to this VOI is then identified using the tree structure computed for the filtered version of the image. This value is displayed to the user as a property of the bounding VOI. The boundary of a 1 cm$^3$ sphere centered on the voxel corresponding to the SUL peak can also be shown on the original image.

9. If the clinician believes this lesion to be clinically relevant and is happy with the VOI delineation, they perform a mouse click (or some other action), and the VOI and SUL are saved to the image overlay layer and the clinician moves to the next suspected lesion. If the clinician is not happy with the VOI delineation (e.g., it includes non-pathological regions of high uptake), they are able to increase the threshold used to create the bounding VOI (e.g., via the arrow keys on the keyboard).

10. When the clinician indicates they have identified all relevant lesions the algorithm then identifies (up to a maximum of 5) the ROIs with the highest mean SUL, which are then passed through to an appropriate reporting mechanism.

The PERCIST constraint that not more than 2 ROIs per organ should be considered may be the most challenging constraint to satisfy; however approximations can be used, such as a minimum distance constraint, or the need for a low intensity region between any two ROIs, or even a more intelligent atlas- or segmentation-based algorithm.

In step 8, the MMMTA has been calculated (in step 3), and this is the default threshold for setting the boundary of the ROI/VOI selected by the user (i.e. finding the candidate region in the tree structure relating to that threshold and associated with the nearest local maximum to the cursor position). However, the MMMTA is only a minimum, and so the user can, in step 9, increase the threshold beyond the MMMTA if needed, for example if the minimum activity gives too large a ROI.

In this specific embodiment, the method for finding the SUL peak in the filtered image (step 8) is as follows. The local maximum in the original image data set associated with the cursor position is found, which gives the bounding VOI from the tree structure. This VOI necessarily contains a specified set of voxels. The same set of voxels is then found in the filtered image (by address/position). Each of these filtered voxels has a value found by the mean intensity of a 1 cm$^3$ spherical VOI centered on the original voxel in that position (from step 5). The algorithm simply chooses, of these filtered values, the largest value i.e. the largest mean intensity of all the 1 cm$^3$ spherical VOIs. It can be seen that the position/address of this largest/maximum value voxel may be different from the position/address of the local maximum voxel in the original image—for example, if the local max is surrounded by an area of lower intensity, and a large area of high (but not maximum) intensity is in a different position.

In an alternative embodiment, the SUL peak is found in the filtered image first, and then the relevant region of interest found in the original image. The tree structure searched in the filtered image is used to rapidly find the address of the maximum value voxel (the largest mean intensity of all the 1 cm³ spherical VOIs)—this could in theory be from the whole image, but more usefully is the closest to the cursor position. The address of the maximum value voxel in the filtered image is found in the original image, to determine the region of interest which has been selected (by cursor position in the filtered image).

Based on this identified voxel in the unfiltered image, a segmentation is generated using the tree structure and the MMMTA threshold, thus providing the region of interest. This segmentation could then be propagated back to the filtered image (if the clinician is happy with it) and any higher or other peak values within the segmentation identified and returned to the clinical. Based on this information, the clinician may want to update the segmentation (i.e. change the region of interest selected) if they feel the peaks are indeed separate lesions.

Regarding step 6, the construction of the tree structure for the filtered image primarily allows a fast means of finding the maximum value voxels in the filtered image data set. It can also be useful in instances where it is not clear whether the region selected contains multiple maxima within a single lesion or multiple lesions. If a region is found in the initial/original image following the tree structure, and the tree structure is also used for the filtered image, this may alert the user to a number of maxima, even though a single maximum SUL peak value has been found by the method in step 8.

FIG. 3 shows a schematic representation certain steps and of the tree generation used for such a facilitated PERCIST analysis. The original image volume (302) is filtered using the 1 cm³ kernel (304), producing the filtered image (306). The tree structure is then created for each image, for all voxels greater than the MMMTA (308, 310). The result from the original image is the tree structure 312 used for delineation of the lesion (for which the SUL peak value is computed), and that from the filtered image is the tree structure used for identifying the SUL peak value (by position corresponding to the user-selected position).

In alternatives embodiments of the invention may include the following:

1. More user interaction, for example, in an embodiment the user is able to explicitly select the reference organ (i.e., liver or mediastinum) and corresponding ROI. They may also be able to specify those ROIs that are reported as part of the PERCIST evaluation (i.e., specify those ROIs which correspond to the same organ).

2. Less user interaction, for example, the algorithm could automatically scan the local maxima and identify the most-likely top 5 candidate ROIs. This would require the rejection of false positive regions of high uptake such as the heart, bladder or kidneys, which may, for example, be achieved using segmentations derived from an appropriate atlas.

3. The evaluation is extended to multi-timepoints, either through the loading of a PERCIST evaluation for previous scans and propagating the ROIs to the closest matching local-maxima regions in the current timepoint, or the concurrent evaluation of all time points.

Referring to FIG. 4, the above embodiments of the invention may be conveniently realized as a computer system suitably programmed with instructions for carrying out the steps of the methods according to the invention.

For example, a central processing unit 404 is able to receive data representative of medical scans via a port 405 which could be a reader for portable data storage media (e.g. CD-ROM); a direct link with apparatus such as a medical scanner (not shown) or a connection to a network.

Software applications loaded on memory 406 are executed to process the image data in random access memory 407.

The processor 404 in conjunction with the software can perform the steps such as obtaining the initial image data set, filtering the initial image data set to generate the filtered data set, registering the user selection of the ROI, and computing the intensity value for the selected ROI.

A Man-Machine interface 408 typically includes a keyboard/mouse/screen combination (which allows user input such as initiation of applications) and a screen on which the results of executing the applications are displayed.

It will be appreciated by those skilled in the art that the invention has been described by way of example only, and that a variety of alternative approaches may be adopted without departing from the scope of the invention, as defined by the appended claims.

Although modifications and changes may be suggested by those skilled in the art, it is the intention of the inventor to embody within the patent warranted hereon all changes and modifications as reasonably and properly come within the scope of his contribution to the art.

We claim as our invention:

1. A computerized method to automatically analyze a selected region of interest in medical image data, comprising:
   providing a computerized processor with a positron emission tomography (PET) image data set comprised of voxels at respective voxel positions;
   in said processor, automatically generating a filtered PET image data set by assigning, to each of said voxels, an intensity value for a standardized volume of interest;
   in said processor, constructing, for both of said PET image data set and said filtered PET image data set, a hierarchical tree structure of voxels representing a relationship between voxel position and local maxima for all voxels having an intensity value above a predetermined threshold;
   in response to a user-selected position in said PET image data set entered into said processor, using the tree structure of the filtered PET image data set to identify a value and position of the local maxima of said standardized volume of interest and using the tree structure of said PET image data set to segment a region of interest therein comprised of all voxels in said PET image data set connected to the local maxima for the user-selected position that are above said threshold; and
   making said segmented region of interest available at an output of said processor in an electronic form that allows a visualized display of the segmented region of interest.

2. A method according to claim 1, wherein the value of intensity for the standardized volume of interest is a value of mean SUL.

3. A method according to claim 1, wherein the standardized volume of interest is a 1 cm³ spherical volume of interest.

4. A method according to claim 1, wherein the value of intensity for the selected region of interest is the local maximum SUL for the region of interest.

5. A method according to claim 1, wherein the step of registering the user selection of the region of interest comprises:
   obtaining a list of voxels of the initial image data set sorted according to intensity;
   registering a user-selection of an initial voxel in the PET image data set; and
   selecting, as the region of interest, at least one voxel from the sorted list according to the intensity of said at least one voxel in relation to the user-selected initial voxel.

6. A method according to claim 5, wherein the step of selecting the region of interest further comprises:
   determining a set of candidate regions of interest in the PET image data set; and
   determining a hierarchy among the set of candidate regions according to intensity,
   wherein the region of interest selected is one of the candidate regions.

7. A method according to claim 6, wherein the hierarchy of candidate regions is generated by a connected-component algorithm.

8. A method according to claim 6, wherein the step of computing the value of intensity for the region of interest comprises:
   determining a region of the filtered PET image data set corresponding to the selected region of interest in the initial image data set; and
   determining the voxel in the filtered image region having the maximum intensity value, and returning that maximum intensity value as the value of intensity for the selected region of interest.

9. A method according to claim 7, wherein the step of determining the region of the filtered image data set comprises:
   obtaining a list of voxels of the filtered PET image data set sorted according to intensity, determining a set of candidate regions of interest in the filtered PET image data set, and determining a hierarchy among this set of candidate regions according to intensity, wherein each filtered set candidate region is associated with a local maximum value of intensity.

10. A method according to claim 5, further comprising:
   pre-processing the filtered PET image data set to generate the list of voxels sorted according to intensity; and
   following generation of the list, registering the user selection of the initial voxel.

11. A method according to claim 5, wherein the region selected in the PET image data set includes the user-selected voxel.

12. A method according to claim 5, wherein the region selected in the PET image data set is a region associated with the closest local maximum intensity value to the user-selected voxel.

13. A method according to claim 5, wherein the minimal metabolically measurable tumor activity is set as a threshold in relation to the user-selected voxel.

14. A method according to claim 13, wherein the list is obtained for those voxels of the filtered PET image data set having values for intensity greater than the minimal metabolically measurable tumor activity.

15. A method according to claim 14, further comprising:
   in said processor, determining a hepatic or mediastinal region of interest in the PET image data set; and
   in said processor, calculating the minimal metabolically measurable tumor activity from a measurement of intensity in the hepatic or mediastinal region of interest.

16. A method according to claim 1, further comprising:
   displaying the PET image data set; and
   displaying with the PET image data set the computed value of intensity for the selected region of interest.

17. An apparatus to automatically analyze a selected region of interest in medical image data, comprising:
   a computerized processor provided with a positron emission tomography (PET) image data set comprised of voxels at respective voxel positions;
   said processor being configured to automatically generate a filtered PET image data set by assigning, to each of said voxels, an intensity value for a standardized volume of interest;
   said processor being configured to construct, for both of said PET image data set and said filtered PET image data set, a hierarchical tree structure of voxels representing a relationship between voxel position and local maxima for all voxels having an intensity value above a predetermined threshold;
   a user interface in communication with said processor via which a user-selected position in said PET image data set is entered into said processor;
   said processor being configured, in response to said entry of said user-selected position, to use the tree structure of the filtered PET image data set to identify a value and position of the local maxima of said standardized volume of interest and to use the tree structure of said PET image data set to segment a region of interest therein comprised of all voxels in said PET image data set connected to the local maxima for the user-selected position that are above said threshold; and
   a display in communication with said processor at which said processor is configured to present a visualized display of the segmented region of interest.

18. A non-transitory, computer-readable data storage medium loaded into a processor, said storage medium being encoded with programming instructions to analyze a selected region of interest in medical image data, and said programming instructions causing said processor to:
   receive a positron emission tomography (PET) image data set comprised of voxels at respective voxel positions;
   generate a filtered PET image data set by assigning, to each of said voxels, an intensity value for a standardized volume of interest;
   construct, for both of said PET image data set and said filtered PET image data set, a hierarchical tree structure of voxels representing a relationship between voxel position and local maxima for all voxels having an intensity value above a predetermined threshold;
   in response to a user-selected position in said PET image data set entered into said processor, use the tree structure of the filtered PET image data set to identify a value and position of the local maxima of said standardized volume of interest and use the tree structure of said PET image data set to segment a region of interest therein comprised of all voxels in said PET image data set connected to the local maxima for the user-selected position that are above said threshold; and
   make said segmented region of interest available at an output of said processor in an electronic form that allows a visualized display of the segmented region of interest.

* * * * *